United States Patent Office 2,862,939
Patented Dec. 2, 1958

2,862,939
ESTERS OF 2,17,21-TRIHYDROXY-4-PREGNENE-3,20-DIONE

Raymond M. Dodson, Park Ridge, and Robert W. Hamilton, Wilmette, Ill., assignors, by mesne assignments, to G. D. Searle & Co., Skokie, Ill., a corporation of Delaware No Drawing. Application August 12, 1954
Serial No. 449,508

5 Claims. (Cl. 260—397.47)

The present invention relates to a new group of steroidal esters and, specifically, to the lower alkanoic acid esters of 2,17,21-trihydroxy-4-pregnene-3,20-dione of the general structural formula

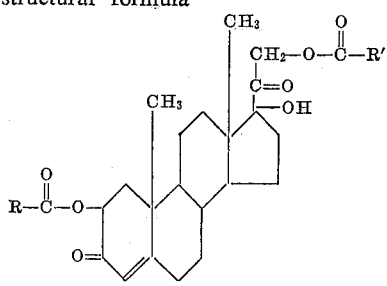

wherein R and R' each represent hydrogen or a lower alkyl radical.

As a starting material for the preparation of the compounds of our invention we have found it convenient to employ the readily available substance 17α-hydroxy-21-acetoxy-4-pregnene-3,20-dione, commonly known as Reichstein's compound S acetate. This compound is treated with a brominating agent such as N-bromosuccinimide or N-bromoacetamide, by means of which a bromine atom is substituted at the 6-position of the steroid nucleus.

When the 6 - bromo - 17 - hydroxy - 21 - acetoxy - 4-pregnene-3,20-dione is heated, for example, in a lower alkanoic acid solvent, with an alkali metal salt of an alkanoic acid, rearrangement and replacement of the bromine atom by a 2-acyloxy group take place. In carrying out this reaction we generally prefer to heat the bromo derivative with a mixture of acetic acid and potassium acetate, since the reaction when conducted in this manner leads to the formation of a well-crystallized product in good yield. The same product is obtained when other alkali metal acetates, such as sodium acetate, are substituted for the potassium acetate. Various other acyloxy groups may be introduced at the 2-position by varying the reagents used, a mixture of potassium propionate and propionic acid, for example, introducing a propionoxy group.

In the course of the rearrangement the acyloxy group which enters the 2-position may assume either the α- or the β-configuration, and in practice we have found that the product actually formed is a mixture of these two stereoisomers. For certain purposes we prefer to use the unseparated mixture of stereoisomers. This is the case, for example, when it is desired to subject the 2,21-diacyloxy steroid to alkaline hydrolysis. Under alkaline conditions both the 2α-acyloxy and the 2β-acyloxy isomers are hydrolyzed to the same 2α,17α,21-triol, thereby affording a convenient means of obtaining a stereochemically pure product.

For other purposes it is desired to separate the mixture of the 2α-acyloxy and 2β-acyloxy isomers, and this separation is carried out by fractional crystallization.

A particular utility of the esters which constitute our invention is that they exhibit certain of the types of physiological activity which are generally associated with adrenocortical hormones oxygenated at position 11, such as cortisone and hydrocortisone. It is well known in the art that the substitution of oxygen at steroid position 11 has been the subject of many research efforts and that, in spite of numerous improvements, the introduction of an oxygenated group at position 11 by synthetic means still requires relatively intricate processes. The compounds of our invention which are oxygenated at the 2-position exhibit some of the physiological properties of the naturally occurring adrenocortical hormones. In particular, they have been found to inhibit the hyperemia that is associated with certain states of inflammation of the iris. The claimed compounds exhibit a greater degree of specificity in their physiological actions than do cortisone and hydrocortisone and, as disclosed in the examples, are synthesized by much less intricate procedures than are required for 11-oxygenated steroids. For all of these reasons the compounds of our invention are marked improvements over the compositions of the prior art.

Our invention will appear in further detail from the examples below. However, it is not to be construed as limited thereby in spirit or in scope. In these examples temperatures are given in degrees centigrade and quantities of material are given in parts by weight.

Example 1

A mixture of 10.05 parts of 17α-hydroxy-21-acetoxy-4-pregnene-3,20-dione, 6.45 parts of N-bromosuccinimide, 225 parts of chloroform, and 0.01 part of benzoyl peroxide is heated under reflux for a period of 90 minutes. The reaction mixture is cooled and washed successively with sodium sulfite solution and then with several portions of water. The chloroform phase is separated, treated with anhydrous sodium sulfate, filtered and evaporated to dryness. The residual material is dissolved in 300 parts of ether, and the crystallizate which forms when the ethereal solution is concentrated is collected on a filter. This product is a 6-bromo-17α-hydroxy-21-acetoxy-4-pregnene-3,20-dione, melting with decomposition at about 167–169° C.

Example 2

A mixture of 5.12 parts of 6-bromo-17α-hydroxy-21-acetoxy-4-pregnene-3,20-dione, 3.22 parts of anhydrous potassium acetate, and 95 parts of glacial acetic acid is refluxed for a period of 30 minutes, cooled to room temperature and poured into a mixture of 500 parts of water and 700 parts of ether. After the product has been partitioned, the ethereal phase is washed with sodium bicarbonate solution and with several portions of water. It is then treated with anhydrous sodium sulfate, filtered and concentrated to dryness. The residual gummy solid is recrystallized from ethanol to give a stereoisomeric mixture of 17-hydroxy-2,21-diacetoxy-4-pregnene-3,20-diones. For some purposes, such as for the preparation of the saponification product, the unseparated mixture of stereoisomers is suitable for use. The product formed in this example may be represented by the following structural formula

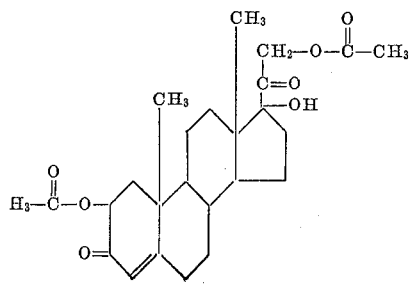

Example 3

The purified 2β-acetoxy isomer, 17α-hydroxy-2β,21-diacetoxy-4-pregnene-3,20-dione, is obtained by repeated recrystallization of the stereoisomeric mixture from mixtures of benzene and petroleum ether. The isomer obtained in this manner melts at about 221–222° C., has a specific rotation $[\alpha]_D^{25} = -10°$ (chloroform), and exhibits an ultraviolet absorption maximum at about 244 millimicrons with a molecular extinction coefficient of 15,260. Infrared absorption maxima are observed at about 2.82, 5.72, 5.79, 5.97, 6.20, 8.06 and 8.22 microns.

Example 4

The purified 2α-acetoxy isomer, 17α-hydroxy-2α,21-diacetoxy-4-pregnene-3,20-dione, is obtained by recovering the residue from the mother liquors remaining after the isolation of the β-isomer, and by subjecting this residue to repeated additional recrystallizations from mixtures of benzene and petroleum ether. The α-acetoxy isomer obtained in this manner melts at about 222–223° C. It has a specific rotation $[\alpha]_D^{25} = +113.5°$ (chloroform), and an ultraviolet absorption maximum at 241 millimicrons (molecular extinction coefficient 16,190). Infrared absorption maxima are observed at 2.88, 5.72, 5.84, 5.96, 6.22 and 8.19 microns. A marked depression of the melting point is observed with a mixture of the α- and β-isomers.

Example 5

A mixture of 2.4 parts of 6-bromo-17α-hydroxy-21-acetoxy-4-pregnene-3,20-dione, 1.7 parts of potassium propionate, and 50 parts of propionic acid is refluxed for a period of 30 minutes. The cooled reaction mixture is partitioned between 300 parts of water and 400 parts of ether. The ethereal phase is washed with sodium bicarbonate solution and with several portions of water, and is then dried over anhydrous sodium sulfate, filtered and evaporated to dryness. Crystallization of the gummy residue from ethanol gives a mixture of the stereoisomeric 2 - propionoxy - 17 - hydroxy - 21 - acetoxy - 4 - pregnene-3,20-diones, having the following structural formula

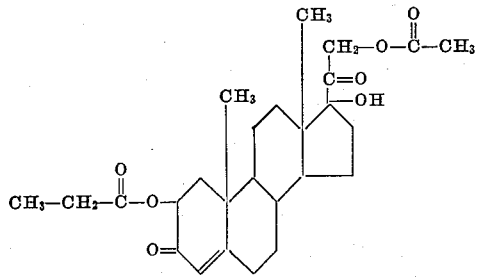

Example 6

A mixture of 3.4 parts of 17α-hydroxy-21-propionoxy-4-pregnene-3,20-dione (prepared in the usual manner by the reaction of 17α,21-dihydroxy-4-pregnene-3,20-dione with pyridine and propionic anhydride for 24 hours at room temperature), 2.0 parts of N-bromosuccinimide, 90 parts of chloroform and 0.01 part of benzoyl peroxide is heated under reflux for a period of 90 minutes. The cooled reaction mixture is washed with sodium sulfite solution and with several portions of water, after which the chloroform phase is separated, treated with anhydrous sodium sulfate, filtered, and evaporated to dryness. The residual product is purified by dissolving it in ether and concentrating the resultant solution until a crystallizate forms. This product is a 6-bromo-17α-hydroxy-21-propionoxy-4-pregnene-3,20-dione.

Example 7

A mixture of 1.7 parts of 6-bromo-17α-hydroxy-21-propionoxy-4-pregnene-3,20-dione, 1.2 parts of potassium propionate and 40 parts of propionic acid is refluxed for a period of 30 minutes and then cooled to room temperature. The reaction mixture is then stirred with 250 parts of water and 400 parts of ether. The ethereal phase is washed with sodium bicarbonate solution and with several portions of water, and is then treated with anhydrous sodium sulfate, filtered and concentrated to dryness. When the residual material is recrystallized from ethanol, the resultant product is a stereoisomeric mixture of 17-hydroxy-2,21-dipropionoxy-4-pregnene-3,20-diones, of the following structural formula

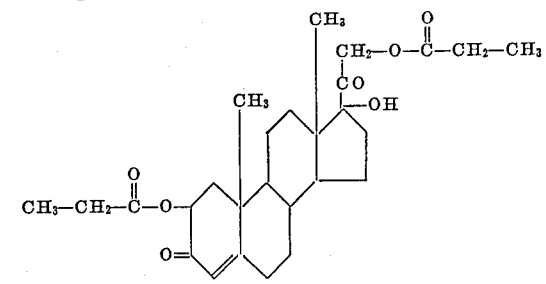

We claim:

1. A compound having the structural formula

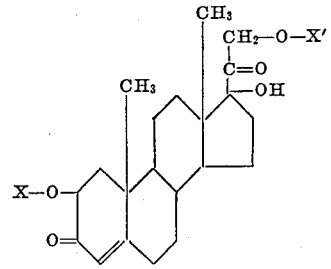

wherein X and X' are acyl radicals derived from lower alkanoic acids containing up to six carbon atoms.

2. A 17-hydroxy-2,21-diacetoxy-4-pregnene-3,20-dione.
3. 17α-hydroxy-2α,21-diacetoxy-4-pregnene-3,20-dione.
4. 17α-hydroxy-2β,21-diacetoxy-4-pregnene-3,20-dione.
5. The process for preparing a 17-hydroxy-2,21-diacyloxy-4-pregnene-3,20-dione which comprises heating a 6 - bromo - 17 - hydroxy - 21 - acyloxy - 4 - pregnene-3,20-dione with an alkali metal acylate.

References Cited in the file of this patent

UNITED STATES PATENTS

| | | |
|---|---|---|
| 2,312,483 | Reichstein | Mar. 2, 1943 |
| 2,602,769 | Murray et al. | July 8, 1952 |
| 2,671,096 | Murray et al. | Mar. 2, 1954 |